(12) United States Patent
Graage

(10) Patent No.: US 6,926,978 B2
(45) Date of Patent: Aug. 9, 2005

(54) FUEL CELL INSTALLATION WITH A GAS GENERATION SYSTEM AND A FUEL CELL SYSTEM

(75) Inventor: Klaus Graage, Kirchheim/Teck (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 359 days.

(21) Appl. No.: 10/218,180

(22) Filed: Aug. 12, 2002

(65) Prior Publication Data

US 2003/0035988 A1 Feb. 20, 2003

(30) Foreign Application Priority Data

Aug. 11, 2001 (DE) .......................................... 101 39 608

(51) Int. Cl.⁷ .............................. H01M 8/04; H01M 8/06
(52) U.S. Cl. .............................. 429/12; 429/19; 429/26
(58) Field of Search .............................. 429/12, 19, 26, 429/34; 180/65.3

(56) References Cited

U.S. PATENT DOCUMENTS

| 6,190,791 B1 | * | 2/2001 | Hornburg | ..................... 429/17 |
|---|---|---|---|---|
| 6,309,768 B1 | * | 10/2001 | Patterson et al. | ............. 429/13 |
| 6,312,843 B1 | * | 11/2001 | Kimbara et al. | ............... 429/25 |
| 6,408,966 B1 | * | 6/2002 | Benz et al. | ................. 180/65.1 |
| 6,551,732 B1 | * | 4/2003 | Xu | ............................... 429/17 |
| 6,565,817 B1 | * | 5/2003 | Kiryu | .......................... 422/220 |

FOREIGN PATENT DOCUMENTS

| DE | 197 55 116 C1 | | 3/1999 | |
|---|---|---|---|---|
| JP | 60028173 A | * | 2/1985 | ............ H01M/8/06 |
| JP | 2000315513 A | * | 11/2000 | ............ H01M/8/04 |

* cited by examiner

Primary Examiner—Gregg Cantelmo
(74) Attorney, Agent, or Firm—Seed IP Law Group PLLC

(57) ABSTRACT

A fuel cell installation containing a gas generation system, for the production of a hydrogen-containing gas, and a fuel cell system, which comprises a fuel cell, a compressor, an expander that is coupled with the compressor and a burner, the exhaust gases of which are directed to the expander. The gas generation system and the fuel cell system are designed as independent modules with respect to the supply of energy and process streams. Energy storage and energy conversion devices are arranged between the expander and the compressor in the fuel cell system.

14 Claims, 2 Drawing Sheets

FUEL CELL INSTALLATION WITH A GAS GENERATION SYSTEM AND A FUEL CELL SYSTEM

CROSS-REFERENCE TO RELATED APPLICATION

This application claims priority to German Patent Application No. 10139608.2, which application is hereby incorporated by reference in its entirety.

BACKGROUND OF THE INVENTION

1. Field of the Invention

The invention is generally directed to a fuel cell installation with a gas generation system, to produce a hydrogen-containing gas, and a fuel cell system.

2. Description of the Related Art

DE 197 55 116 C1 describes a fuel cell system, in which the air supply system for a fuel cell includes a compressor that obtains at least part of the required energy from an expander. The expander is driven by the hot exhaust gases of a burner, in particular a catalytic burner. The burner burns exhaust gases from the anode chamber and the cathode chamber of the fuel cell, which contain oxygen and residual amounts of fuel that have not been converted in the fuel cell.

In order to compensate for higher power requirements by the compressor, it is possible to increase the output of the expander by providing methanol as an additional fuel to the burner. As a result, the expander is able to provide more power for the compressor. However, this design has the disadvantage that its response to strongly varying dynamic power requirements by the compressor is not fast enough. Consequently, the power demand is often not met. For this reason, the compressor must be equipped with a further driving element, for example an electric motor, in order to ensure reliable operation in all situations.

Also known are fuel cell systems, which utilize the energy produced by a catalytic burner to supply thermal energy to a gas generation system or to individual components of a gas generation system. This offers definite advantages with respect to the overall system efficiency. However, this direct thermal coupling between the fuel cell system and a gas generation system also has some disadvantages. For example, it complicates the operation of the overall installation during start-up since the exhaust gas that is required for heating purposes originates in the component that is usually arranged in the most downstream position. Accordingly, all other components must first be heated and operational.

In addition, the direct thermal coupling makes the overall installation more susceptible to faults, since performance problems in one part of the system may automatically cause problems in other parts of the installation, which otherwise could be prevented. For example, if the catalytic burner degrades, the required temperature—for example, for reforming or a similar process—can no longer be obtained. This disturbs the entire operating sequence, even though the other parts of the installation still operate without problems. As a result, the entire installation can be affected, since operation of the gas generation system and the fuel cell system are directly coordinated and linked with each other.

Accordingly, there remains a need for improved fuel cell installations that overcome the disadvantages set forth above. The present invention fulfills one or more of these needs, and provides further related advantages.

BRIEF SUMMARY OF THE INVENTION

In brief, this invention is directed to a fuel cell installation with a gas generation system, to produce a hydrogen-containing gas, and a fuel cell system.

In one embodiment, a fuel cell installation comprising a gas generation system and a fuel cell system is disclosed, wherein the gas generation system and the fuel cell system are independent systems with respect to the supply of energy and process streams. The fuel cell system comprises a fuel cell, a compressor, an expander coupled with the compressor, a burner connected to the expander and energy storage and energy conversion devices connected to and located between the compressor and the expander.

In further embodiments, a motor vehicle comprising the fuel cell installation of this invention is disclosed.

These and other aspects of this invention will be apparent upon reference to the attached figures and following detailed description.

BRIEF DESCRIPTION OF THE SEVERAL VIEWS OF THE DRAWING(S)

DETAILED DESCRIPTION OF THE INVENTION

As noted above, this invention is directed to a fuel cell installation with a gas generation system, to produce a hydrogen-containing gas, and a fuel cell system.

Figure 1:
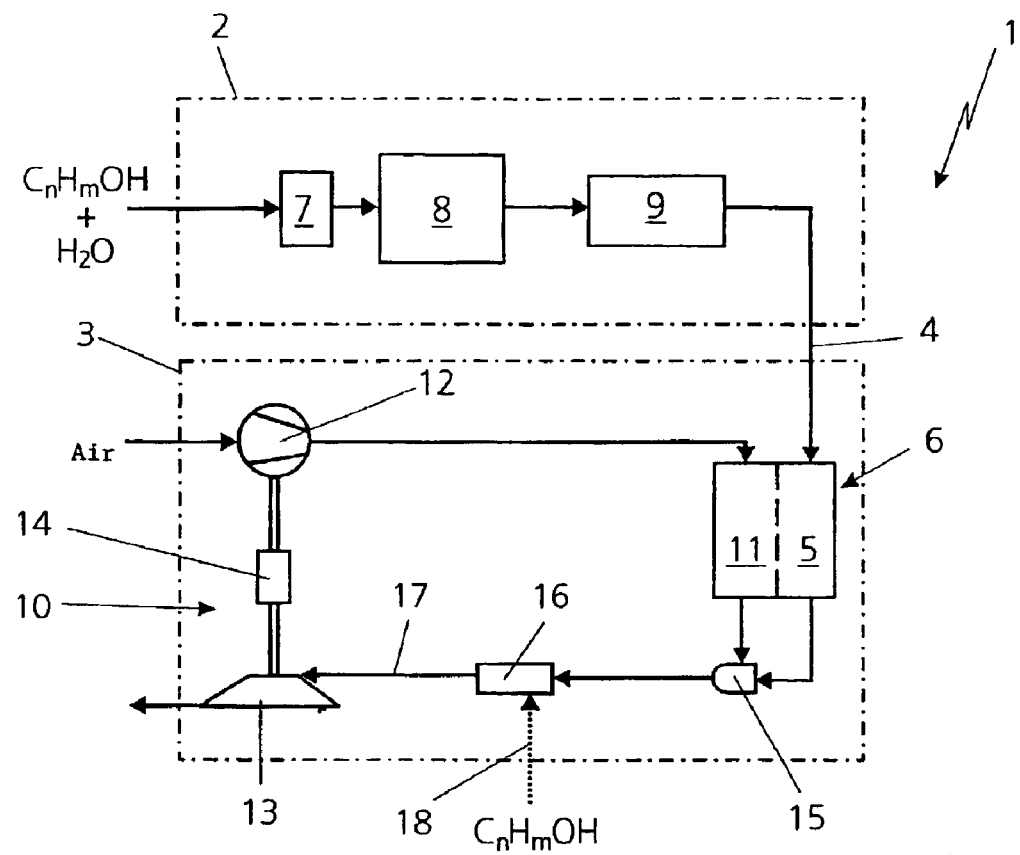
FIG. 1 shows a schematic representation of a representative fuel cell installation.

FIG. 1 shows a representative fuel cell installation 1 with a gas generation system 2 and a fuel cell system 3.

In a well-known manner, gas generation system 2 produces a hydrogen-containing gas from feed substances, for example from water ($H_2O$) and a hydrocarbon derivative ($C_nH_mOH$), whereby the produced hydrogen-containing gas is supplied to an anode chamber 5 of a fuel cell 6 through a line 4. A typical gas generation system 2 comprises, for example, an evaporator 7, a partial oxidation device 8 and a selective oxidation device 9 for the removal of carbon monoxide from the hydrogen-containing gas. Instead of partial oxidation device 8, a reformer or similar device can be substituted, which allows a comparable conversion of the feed substances to a hydrogen-containing gas.

Air is supplied to a cathode chamber 11 of fuel cell 6 by an air module 10. After reaching anode chamber 5 of fuel cell 6 through line 4, the hydrogen-containing gas and air are converted in a well-known manner to water and electrical power.

Air module 10, which is part of fuel cell system 3, comprises at least one compressor 12, which compresses ambient air and supplies it to cathode chamber 11 of fuel cell 6. Air module 10 further comprises an expander 13. The basic purpose of expander 13 is to recover energy from fuel cell installation 1, whereby expander 13 is coupled with compressor 12 through energy storage and energy conversion devices 14.

The exhaust gases being discharged from anode chamber 5 and cathode chamber 11 of fuel cell 6 normally contain residual oxygen, hydrogen, and non-reacted residues of the hydrocarbon derivative. These exhaust gases are mixed in a mixer 15 and are fed to a burner 16. Burner 16 combusts the exhaust gases and converts their chemical energy into thermal energy, whereby the combustion may be a pure flame combustion process or a catalytic combustion process.

Subsequently, the hot exhaust gases flow through a line 17 into expander 13, where they are expanded. In expander 13, the exhaust gases release a significant part of their energy, which is then provided—through the coupling of expander 13 with compressor 12 by means of energy storage and energy conversion devices 14—to drive compressor 12.

Optionally, for the purpose of increasing the energy yield of expander 13, burner 16 can be supplied with additional fuel through a line 18. The additional fuel that is supplied to burner 16 through line 18 may be the same feed substance that is already employed by fuel cell installation 1 (e.g. hydrocarbon derivative $C_nH_mOH$).

FIG. 1 shows the modular design of gas generation system 2 and of fuel cell system 3, which comprises fuel cell 6, air module 10 and burner 16. This design deliberately does not include the direct thermal coupling between burner 16 and evaporator 7 or a reactor stage (e.g. a reformer or the like), which is used for the conversion of the hydrocarbon derivative. The fact that the heating of gas generation system 2 is independent of the exhaust gases of fuel cell system 3 significantly increases the system reliability of fuel cell installation 1. Another effect of this design is that different gas generation systems 2 can be combined with different fuel cell systems 3 without the need, or with a significantly reduced need, for a direct constructional matching of the two systems with respect to output, energy consumption, and similar parameters. The modular design results in significant advantages for manufacturing, dimensioning, and assembly of a fuel cell installation of this type, since modules can be manufactured independently and assembled at a later time.

The energy that has been recovered by burner 16 from the exhaust gases of fuel cell 6 of fuel cell installation 1 can either be supplied directly to compressor 12 by expander 13, or can be converted and/or stored in energy storage and energy conversion devices 14.

Figure 2:
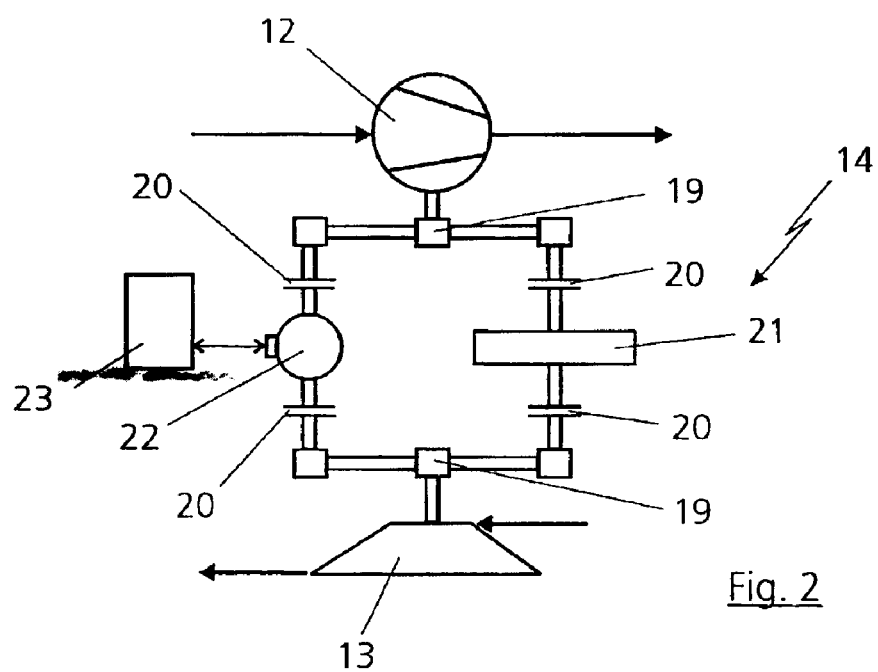
FIG. 2 shows a schematic representation of a representative configuration of the energy storage and energy conversion devices of the fuel cell installation of FIG. 1.

FIG. 2 shows a representative configuration of energy storage and energy conversion devices 14. Energy storage and energy conversion devices 14 are shown between compressor 12 and expander 13, which are integrated into fuel cell system 3 of FIG. 1 in the above-described manner. In FIG. 2, a flywheel 21 and an electrical machine 22 are employed as energy storage and energy conversion devices 14 in the mechanical link between expander 13 and compressor 12 with the help of suitable gear equipment 19 and clutches 20. Depending on the system requirements, clutches 20 may be used to switch between energy storage and energy conversion devices 14 being driven by expander 13 or energy storage and energy conversion devices 14 driving compressor 12.

When expander 13 provides energy, flywheel 21 will be accelerated if clutch 20 between flywheel 21 and expander 13 is engaged. Engaging the subsequent clutch 20 between flywheel 21 and compressor 12 enables compressor 12 to be simultaneously driven at a corresponding rate. If fuel cell 6 provides an excess amount of energy in its exhaust gases, flywheel 21 can store any excess energy not currently needed by compressor 12. In the event of a sudden power requirement of compressor 12, which expander 13 is not able to meet, energy stored in flywheel 21 can be utilized to meet the power requirements of compressor 12. This enables flywheel 21 to compensate for highly dynamic fluctuations in power demand.

If expander 13 supplies an excess amount of power, electrical machine 22 may be operated as a generator, whereby the electrical energy generated by electrical machine 22 is fed to an energy storage device 23, where it is stored. If the power demand of compressor 12 is higher than the power that expander 13 can provide, then electrical machine 22 can be operated as an electrical motor, which obtains its energy from energy storage device 23, to drive compressor 12.

In a further embodiment, energy storage device 23 can be a battery, for example, a battery that is required for a motor vehicle or fuel cell installation 1, or a supercapacitor. A supercapacitor would have advantages over a battery, in the case of dynamic energy demands, since the loss of energy that occurs when power is introduced by a strong current is smaller for a supercapacitor than for a battery.

In a still further embodiment, energy storage device 23 could be a combination of supercapacitor and battery, so that in the event of a highly dynamic fluctuations in power output, the supercapacitor would act as an intermediate buffer, which would absorb the suddenly available power of a high current and would then slowly transfer this power to the battery with a regulated charging current in order to keep the losses in the battery as small as possible. In such a configuration, with electrical machine 22 and a supercapacitor/battery energy storage device 23, flywheel 21 is no longer necessary.

A flywheel 21 may also be exclusively employed as a means to store excess energy. The exclusive use of flywheel 21 can increase efficiency, since such use does not require two energy conversion steps (e.g. from mechanical into electrical energy and the reverse). However, a combination of flywheel 21 and electrical machine 22 with energy storage device 23 offers the most flexibility with respect to the recovery of energy by expander 13 and the energy supply of compressor 12, which accommodates a highly dynamic energy demand.

Figure 3:
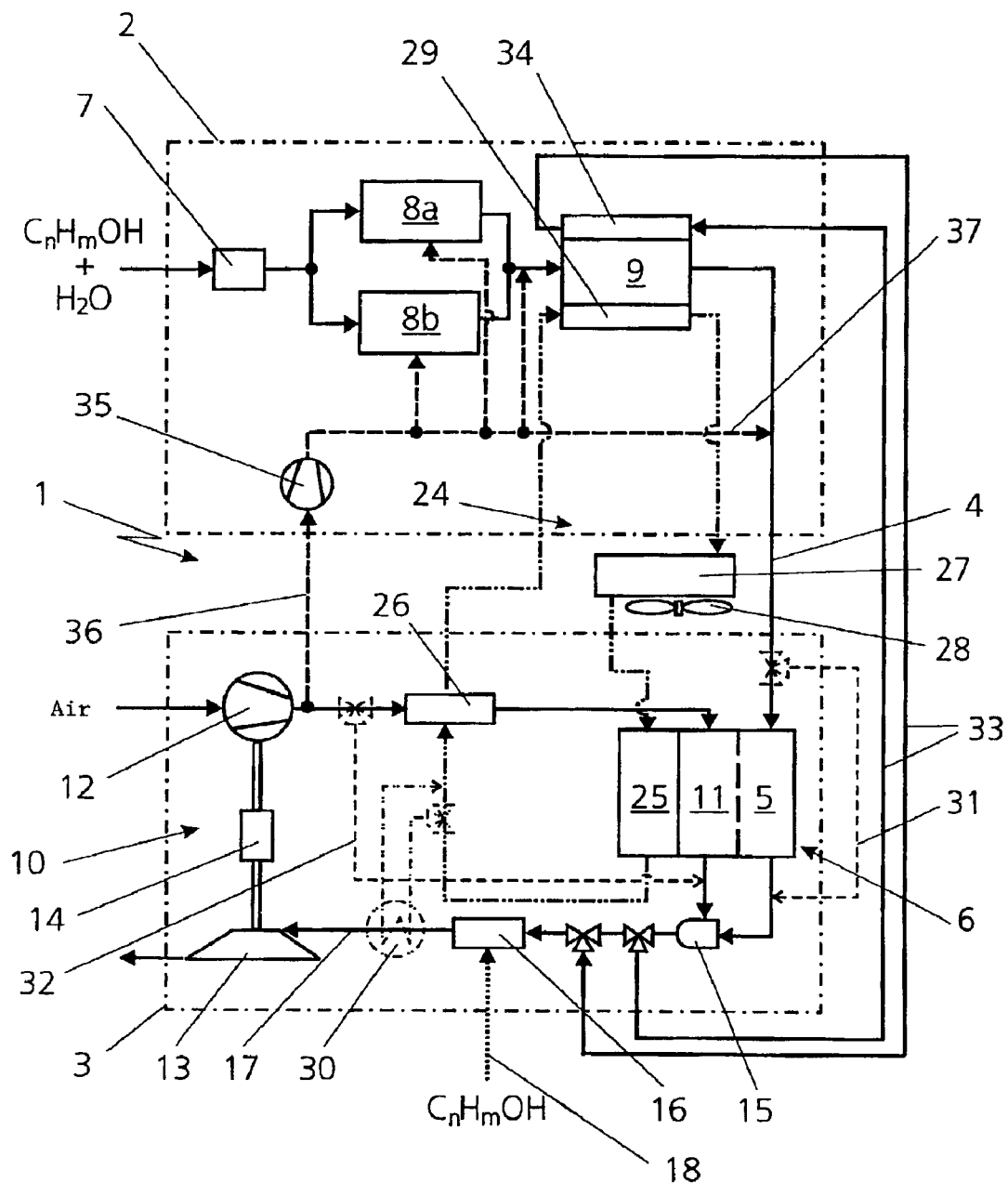
FIG. 3 shows a schematic representation of an additional representative fuel cell installation.

FIG. 3 shows an additional representative embodiment of fuel cell installation 1, in which a combined cooling cycle 24 is provided (represented by the dash-dot-dot type lines in FIG. 3). Combined cooling cycle 24 primarily serves to cool fuel cell 6, whereby the medium flowing through the combined cooling cycle 24, for example a water/antifreeze agent mixture, also flows through a combined cooling area 25 of fuel cell 6. Combined cooling cycle 24, which contains a conventional cooling agent delivery device (not shown), comprises—in addition to cooling area 25 of fuel cell 6—one charge-air intercooler 26 as well as one vehicle radiator 27. Vehicle radiator 27 is shown with a fan 28 and, in a well-known manner, dissipates the thermal energy in combined cooling cycle 24 to the surroundings (e.g., to a passenger compartment heater or the like).

The cooling medium that flows through combined cooling cycle 24 also flows through a temperature control area 29 of selective oxidation device 9. Temperature control area 29 of selective oxidation device 9 is arranged as the final element—with respect to the flow direction of the cooling medium—in combined cooling cycle 24 (e.g., upstream of vehicle radiator 27), so that the cooling medium is at a relatively high temperature when it reaches temperature control area 29. This facilitates the comparatively high temperature that is desired for an optimum process in selective oxidation device 9 and enables selective oxidation device 9 to be heated during start-up of the fuel cell installation 1 by the cooling medium, using temperature control area 29 and combined cooling cycle 24.

Combined cooling cycle 24 can also be equipped with a heat exchanger 30 in the area of line 17. Heat exchanger 30 can introduce thermal energy that has been produced by burner 16 into combined cooling cycle 24, so that combined cooling cycle 24 can be heated very quickly. During start-up of fuel cell installation 1, this enables all of the components to be quickly heated to the required operating temperature. In particular, selective oxidation device 9 can be heated using temperature control area 29 and combined cooling cycle 24 to a high temperature at an early point in time during start-up, so that selective oxidation device 9 can oxidize the available carbon monoxide in the hydrogen-containing gas stream to carbon dioxide.

The carbon monoxide content in the hydrogen-containing gas flowing through line 4 must be at a low concentration before the hydrogen-containing gas can be allowed to flow through anode chamber 5 of fuel cell 6 and before fuel cell 6 commences operation. Prior to that time, during start-up, the hydrogen-containing gas contains a comparatively high carbon monoxide content and anode chamber 5 of fuel cell 6 must be bypassed through a bypass line 31, so that the carbon monoxide in the hydrogen-containing gas stream does not adversely affect components of fuel cell 6.

Cathode chamber 11 of fuel cell 6 is also provided with a bypass line 32, to be used during a start-up, to supply the air compressed by compressor 12 directly to mixer 15 and burner 16. As shown in FIG. 3, bypass line 32 bypasses cathode chamber 11 of fuel cell 6 and charge-air intercooler 26, so that the air arriving at mixer 15 during start-up is comparatively hot and is able to evaporate still liquid substances in the hydrogen-containing gas stream before these substances reach burner 16. This contributes to increased efficiency of burner 16.

In addition to bypass lines 31 and 32 which are required during a start-up operation of fuel cell installation 1, and optional heat exchanger 30 also for use during start-up, fuel cell installation 1 contains two lines 33 to be used during regular operation, through which the exhaust gas, which flows from mixer 15 to burner 16, can be supplied to selective oxidation device 9 through a second temperature control area 34. During regular operation, this exhaust gas, which at least partially flows through temperature control area 34 of selective oxidation device 9, is used to cool selective oxidation device 9. At the same time, the thermal energy dissipated from selective oxidation device 9 is returned in the re-circulated exhaust gas through lines 33 to burner 16, and consequently to expander 13, where this energy is at least partially recovered.

As shown in FIG. 3, gas generation system 2 is configured with two partial oxidation devices 8a and 8b. These partial oxidation devices 8a and 8b are supplied with an evaporated mixture of water and a hydrocarbon derivative by an evaporator 7. In a further embodiment, each of the partial oxidation devices 8a and 8b is supplied by its own evaporator 7.

The use of partial oxidation devices 8a and 8b, connected in parallel, shortens the heating time required during start-up of the fuel cell installation 1. During start-up of gas generation system 2, only partial oxidation device 8a is heated to the temperature required for proper operation, which—due to the lower mass of partial oxidation device 8a—can occur more rapidly than heating both partial oxidation devices 8a and 8b. Partial oxidation device 8b is only heated after heated partial oxidation device 8a has enabled operation of fuel cell installation 1 to commence. At that time the full power of fuel cell installation 1 is available.

Gas generation system 2 of fuel cell installation 1 is supplied with air by a high-pressure compressor 35, which is supplied through a line 36 with air that has been compressed or pre-compressed by compressor 12. High-pressure compressor 35 supplies the required air contained therein to partial oxidation devices 8a and 8b and to selective oxidation device 9. In addition, a line 37 leads to line 4 and adds air at that position to the hydrogen-containing gas stream. This air metering into the gas stream for the anode, which is known as "air bleed", promotes the stable operation of fuel cell system 3 of fuel cell installation 1.

Gas generation system 2 and fuel cell system 3 of fuel cell installation 1 are independent, except for the pre-compression of the air for gas generation system 2, which is carried out by compressor 12 of fuel cell system 3. However, a direct relationship with respect to the dosage or the like is not required so gas generation system 2 and fuel cell system 3 can still be considered to be independent. Combined cooling cycle 24, through which temperature control area 29 of selective oxidation device 9 is integrated with components of fuel cell system 3, is not dependent on the respective performance requirements of gas generation system 2 and fuel cell system 3 to a degree that would require a large amount of tuning during the design of gas generation system 2 and fuel cell system 3. If required, such tuning would jeopardize the above-mentioned modular design and its advantages with respect to the independence of gas generation system 2 and fuel cell system 3.

The fact that no input of thermal energy is required for partial oxidation to occur in gas generation system 2, as would be in the case of reforming, makes it possible to implement the modular design using independent modules, since gas generation system 2 requires thermal energy only for the purpose of the evaporation of the feed substances, for example water and a hydrocarbon derivative. This thermal energy may be provided by means of electrical heating or a similar method.

From the foregoing it will be appreciated that, although specific embodiments of the invention have been described herein for purposes of illustration, various modifications may be made without deviating from the spirit and scope of the invention. Accordingly, the invention is not limited except as by the appended claims.

All of the above U.S. patents, U.S. patent application publications, U.S. patent applications, foreign patents, foreign patent applications and non-patent publications referred to in this specification and/or listed in the Application Data Sheet are incorporated herein by reference, in their entirety.

What is claimed is:

1. A fuel cell installation comprising a gas generation system and a fuel cell system, wherein the gas generation system comprises a partial oxidation device adapted to produce a hydrogen-contaning gas, and the fuel cell system comprises:

a fuel cell;

a compressor;

an expander connected to the compressor;

a burner connected to the expander; and energy storage and energy conversion devices connected to, and located between, the compressor and the expander, and wherein no thermal energy produced by the burner of the fuel cell system is supplied to the partial oxidation device of the gas generation system.

2. The fuel cell installation of claim 1 wherein the burner comprises a flame burner.

3. The fuel cell installation of claim 1 wherein the burner comprises a catalytic burner.

4. The fuel cell installation of claim 1 wherein the partial oxidation device comprises two partial oxidation devices connected in parallel.

5. The fuel cell installation of claim 1 wherein the gas generation system further comprises an evaporator located upstream of the partial oxidation device.

6. The fuel cell installation of claim 1 wherein the energy storage and energy conversion devices comprise:

an electrical machine; and an electrical energy storage device coupled to the electrical machine.

7. The fuel cell installation of claim 1 wherein the energy storage and energy conversion devices comprise a flywheel.

8. The fuel cell installation of claim 1 wherein the gas generation system and the fuel cell system comprise a combined cooling cycle, and wherein the combined cooling cycle is adapted to control the temperature of the fuel cell and a selective oxidation device of the gas generation system.

9. The fuel cell installation of claim 8, further comprising a heat exchanger.

10. The fuel cell installation of claim 8 wherein the combined cooling cycle comprises:

a charge-air intercooler connected to the compressor; and a vehicle radiator adapted to dissipate thermal energy.

11. The fuel cell installation of claim 10, further comprising, between the compressor and the charge-air intercooler, a branch line capable of delivering air to the gas generation system by way of a high pressure compressor.

12. The fuel cell installation of claim 10, further comprising:

a first bypass line that bypasses an anode chamber of the fuel cell; and a second bypass line that bypasses the charge-air intercooler and a cathode chamber of the fuel cell.

13. The fuel cell installation claim 10, further comprising lines, located upstream of the burner, capable of delivering exhaust gases of the fuel cell to the selective oxidation device.

14. A motor vehicle comprising the fuel cell installation of claim 1.

* * * * *